United States Patent [19]
Dietrich et al.

[11] 3,864,233
[45] Feb. 4, 1975

[54] URANIUM-SENSITIVE ELECTRODE MEMBRANE

[75] Inventors: William C. Dietrich, Knoxville; Delmer L. Manning, Oak Ridge, both of Tenn.

[73] Assignee: The United States of America as represented by the United States Atomic Energy Commission, Washington, D.C.

[22] Filed: Dec. 17, 1973

[21] Appl. No.: 425,415

[52] U.S. Cl. ............. 204/195 M, 204/1 T, 204/296
[51] Int. Cl. ........................................... G01n 27/46
[58] Field of Search .............. 204/195 M, 296, 1 T; 260/92.8 R

[56] References Cited
UNITED STATES PATENTS
3,450,631  6/1969  Bloch et al............................ 210/22

*Primary Examiner*—G. L. Kaplan
*Attorney, Agent, or Firm*—John A. Horan, David S. Zachry, John B. Hardaway

[57] ABSTRACT

A uranyl sensitive membrane, useful in an electrochemical concentration cell, comprising a uranyl complex of an organophosphoric acid embedded within a polyvinyl chloride matrix.

6 Claims, 2 Drawing Figures

3,864,233

URANIUM-SENSITIVE ELECTRODE MEMBRANE

BACKGROUND OF THE INVENTION

This invention was made in the course of, or under, a contract with the United States Atomic Energy Commission. It relates generally to the art of determining uranium concentrations in acid solution.

In the field of nuclear fuel reprocessing and in uranium purification work, it is necessary from time to time to know the uranium concentrations in acid solution. At present, uranium analysis is carried out by fluorometric analysis whereby periodic samples are transported to remote laboratories for such analysis. Such a procedure is cumbersome and time consuming. It would be highly desirable to have an on-line system for continuously monitoring uranium concentrations and to have a system for providing essentially instantaneous analysis as to uranium or uranyl concentrations. Also, in the field of nuclear fuel preparation by either the sol-gel or ion-exchange techniques it would be desirable to have a system for determining uranium concentration.

Various electrochemical techniques are available for determining specific ion concentrations. The most widely used technique involves the use of a glass electrode for determining hydrogen ion concentrations (pH). Electrode systems for determining species other than hydrogen are referred to by various generic names such as ion selective electrodes or specific ion electrodes. However, no such electrode or system has previously been found for determining uranium concentrations.

SUMMARY OF THE INVENTION

It is thus an object of this invention to provide a system for continuously monitoring uranium concentrations.

It is a further object of this invention to provide a system for substantially instantaneously indicating uranium concentrations.

It is thus a further object of this invention to provide an electrode system which is sensitive to uranyl ions.

These as well as other objects are accomplished by using conventional electrochemical techniques utilizing a novel membrane which is selective to uranyl ions. Such a membrane is a uranyl complex of an organophosphoric acid embedded with a polyvinyl chloride matrix.

DETAILED DESCRIPTION

According to this invention it has been found that a uranyl complex of an organophosphoric acid embedded within a polyvinyl chloride matrix is selective to uranyl ions and may be used in an electrochemical cell for the determination of uranyl concentrations. The method of preparing the uranyl sensitive membrane of this invention is described after first giving a description of the electrochemical system of which the novel membrane is a part.

Figure 1:
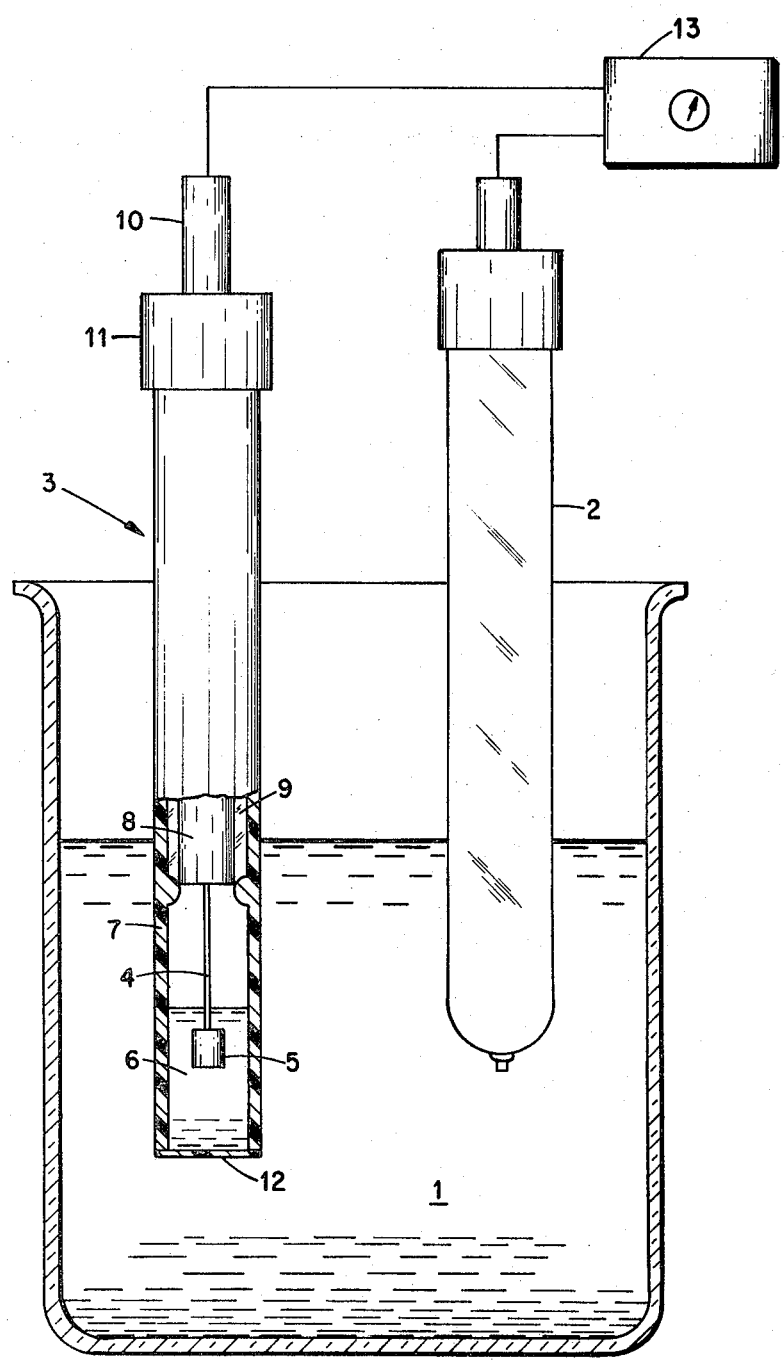
FIG. 1 schematically illustrates an electrochemical system embodying the uranyl sensitive membrane of this invention.

Referring to FIG. 1 of the drawings, a salt solution 1 containing uranyl ions is analyzed for uranyl concentration by electrodes 2 and 3. Electrode 2 is a standard calomel electrode (S.C.E.) such as that generally used in the prior art. A "Corning" fiber junction calomel electrode, Cat. No. 476,000, was used in the Examples which follow.

Electrode 3 is the sensing electrode which comprises a silver wire 4 coated with silver chloride 5 in an aqueous solution of uranyl chloride 6. The solution is contained within polyvinyl chloride tube 7 which has glass tube 8 sealed within it by means of wax 9. Silver wire 4 is connected to wire 10 within tube 7 which, in turn, passes through end cap 11. Wire 10 is connected to meter means 13. Such meter means 13 may be a potentiometer or high impedance voltmeter such as an electrometer, but is preferably an expanded scale pH meter. All of the above-mentioned elements are generally conventional. The novel feature of the sensing electrode 3 is the uranyl sensitive membrane 12 which contacts solutions 1 and 6.

As with most concentration cells, it is not entirely understood how the membrane operates, but apparently a charge buildup of uranyl ions is created within the membrane due to the difference in uranyl activities on either side thereof. This charge buildup creates an emf which is detected by meter means 13. The response is substantially Nernstian.

The uranyl sensitive electrode is comprised of a uranyl complex of an organophosphoric acid embedded within a polyvinyl chloride matrix. Useful organophosphoric acids have been found to be di(2-ethylhexyl) phosphoric acid, di(2-ethyl-4-methyl-pentyl) phosphoric acid, and mono-n-butyl phosphoric acid. The membrane is prepared by first reacting a uranyl salt, such as a chloride or nitrate, with the organophosphoric acid to form the uranyl complex and then preferably dissolving the uranyl complex in a stabilizing solvent. Such stabilizing solvents may be selected from the group consisting of diamyl amyl phosphonate, tri-2-ethyl butyl phosphonate, and di(2-ethylhexyl) phosphonate. The stabilizing solvent is not absolutely essential, but greatly improves the life of the resulting membrane. If the solvent is not used, the uranyl organophosphoric acid complex tends to polymerize, which results in uranyl immobilization. Preferably, the complex is formed by adding uranyl nitrate to the organophosphoric acid and then separating the complex from the aqueous phase by centrifugation. Polyvinyl chloride is dissolved in tetrahydrofuran and then added to the uranyl complex solution. This overall solution is then used to produce the final membrane. This is done by placing the solution on a suitable substrate and allowing the tetrahydrofuran to evaporate. After evaporation, the membrane can be peeled off of the substrate and cut to an appropriate shape.

The membrane is typically on the order of 0.5 millimeter thick. It is easily cut but otherwise rugged and exhibits permaselectivity to uranyl ions. The final membrane is generally about 4 to 8 wt. percent complex, 55 to 65 percent stabilizer, and 30 to 40 percent polyvinyl chloride. These ranges are not critical and operability may be achieved outside of these limits. Preferably the membrane is about 6 percent complex, 33 percent polyvinyl chloride, and 61 percent stabilizer.

Ion selective membranes prepared by the process of this invention have been found to exhibit substantially Nernstian behavior in chloride solutions within the pH range of 2.5 to 4.0 and with uranyl molarities of from $10^{-4}$ to $10^{-1}$. The exact operable temperature range is not precisely known, but is believed to be from below room temperature to about 60°C. The membrane is useful for determining uranyl activities basically in chloride solutions but is operable in nitrate, sulfate, and fluoride solutions at molarities of $10^{-3}$ and less. In general, the membrane is useful in any type solution which will not alter the membrane permaselectivity. Carbonate and phosphate solutions are examples of solutions in which the membrane will not operate.

Having generally described the invention, the following specific examples of preferred embodiments are given as a further aid to the understanding thereof.

EXAMPLE I

A uranyl sensitive membrane was prepared by dissolving 1.00 gram of $UO_2(NO_3)_2 \cdot 6H_2O$ in 2 milliliters of the di(2-ethylhexyl) phosphoric acid. The aqueous phase was then removed from the yellow viscous complex phase by centrifuging. The complex was dried with two 100-milligram portions of anhydrous $Na_2SO_4$. The complex was next separated from the $Na_2SO_4$ dessicant by again centrifuging.

Preparation of the membrane was accomplished by weighing into a clean, dry, 50-milliliter beaker 50 milligrams of the uranyl complex, 500 milligrams of diamyl amyl phosphonate in the optimum weight ratio of 1:10. To this solution was then added 6 milliliters of a solution of polyvinyl chloride which was prepared by dissolving 2.75 grams of polyvinyl chloride in 60 milliliters of tetrahydrofuran. The beaker was covered with two sheets of filter paper held in place by rubber bands and set aside to allow the tetrahydrofuran to slowly evaporate. Twenty-four hours was required for the membrane to set up. The membrane appeared as a thin yellowish-colored film adhering to the bottom of the beaker.

EXAMPLE II

Figure 2:
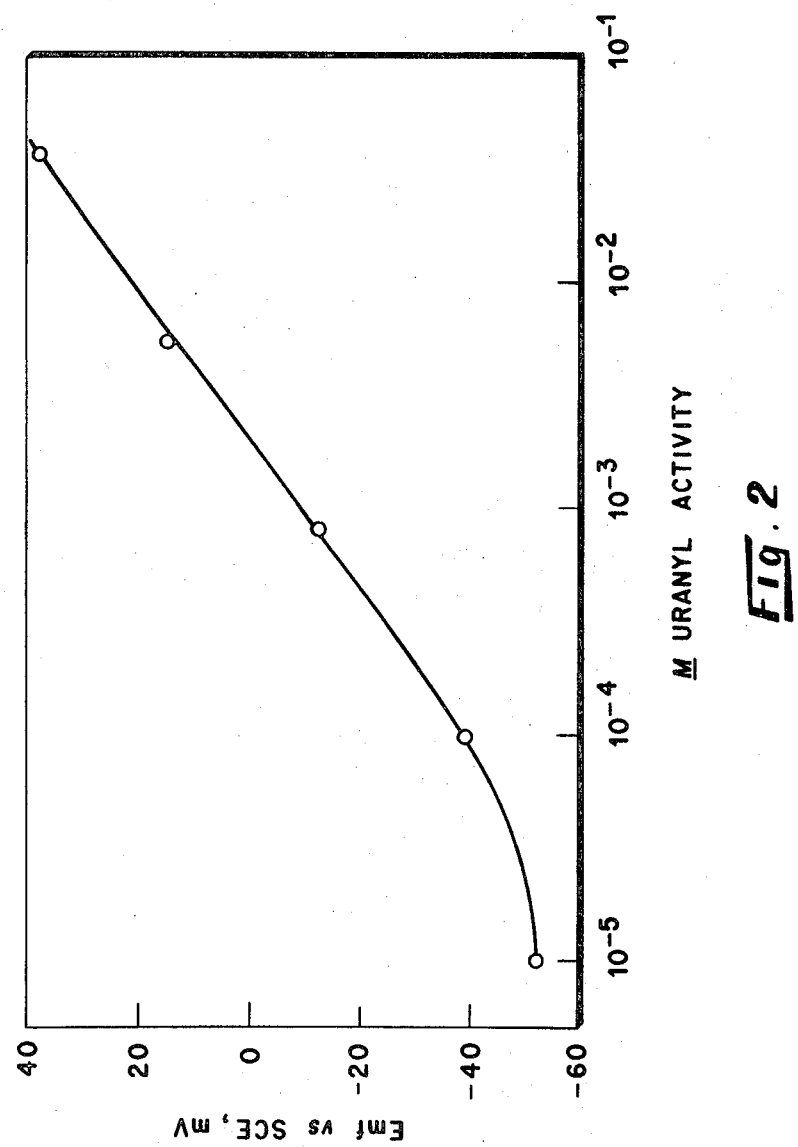
FIG. 2 graphically depicts results achieved using the uranyl sensitive membrane of this invention.

A membrane prepared as described in Example I was cut into a disk of about 6 millimeters in diameter and attached to the bottom of a polyvinyl chloride tube as shown in FIG. 1, by using an adhesive made by dissolving some polyvinyl chloride in tetrahydrofuran. The inner portion of the tube was filled with a solution of 0.001 molar $UO_2Cl_2$ adjusted to pH 3. The membrane end of the sensing electrode was submerged in an aqueous solution of uranyl chloride adjusted to pH 3 and allowed to equilibrate for 24 hours. Voltage measurements were made at room temperature (nominally 25°C) on uranyl chloride solutions at pH about 3 and ranging in uranyl ion concentration from $10^{-5}$ to $10^{-1}$ molar. The results of these measurements are shown in FIG. 2.

EXAMPLE III

A second membrane was incorporated into a sensing electrode as described in Example II. The sensing electrode was immersed into sample solutions of different uranyl ion concentrations. The voltage measurements became stable within about 2 to 3 minutes. The voltage results which are also depicted in FIG. 2 exhibit a slope of 26 millivolts per decade of uranium ion concentration. Theoretical considerations predict a slope of 29 millivolts per decade, for a divalent ion which indicates that the sensing electrode is responding to the divalent uranyl ion. The electrode gave reproducible results over a period of several weeks.

While it has been stated that the uranyl sensitive membrane of this invention is useful in chloride solutions within the pH range of 2.5 to 4.0 and uranyl ion molarities of $10^{-1}$ to $10^{-4}$, it is readily apparent that it may be adapted for use with process solutions which exceed these limits. For example, side streams may be appropriately diluted or concentrated. Anions other than chloride may be converted to chloride form by, for example, simply boiling a small nitrate aliquot with excess chloride to remove excess nitrate and pH adjusted for optimum performance of the electrode.

What is claimed is:

1. A uranyl sensitive membrane comprising a uranyl complex of an organophosphoric acid embedded within a polyvinyl chloride matrix, said organophosphoric acid being selected from the group consisting of di (2-ethylhexyl) phosphoric acid, di (2-ethyl-4 methylpentyl) phosphoric acid, and mono-n-butyl phosphoric acid.

2. The membrane according to claim 1 further including a polymerization inhibitor for said uranyl complex.

3. The membrane according to claim 2 wherein said membrane consists essentially of 4 to 8 weight percent complex, 30 to 40 percent polyvinyl chloride, and 55 to 65 percent inhibitor.

4. The membrane according to claim 3 wherein said membrane consists essentially of 6 percent complex, 33 percent polyvinyl chloride, and 61 percent inhibitor.

5. The membrane according to claim 2 wherein said inhibitor is selected from the group consisting of diamyl amyl phosphonate, tri-2-ethyl butyl phosphonate, and di(2-ethylhexyl) phosphonate.

6. The membrane according to claim 1 wherein said organophosphoric acid is di(2-ethylhexyl) phosphoric acid.

* * * * *